United States Patent [19]
Pao et al.

[11] Patent Number: 5,520,159
[45] Date of Patent: May 28, 1996

[54] BURNED GAS RECYCLING SYSTEM WITH POWERTRAIN OPTIMIZATION

[75] Inventors: Hsien C. Pao, Plymouth; Peter J. Maloney, Dearborn; Roger L. Huffmaster, Canton, all of Mich.

[73] Assignee: Ford Motor Company, Dearborn, Mich.

[21] Appl. No.: 352,483

[22] Filed: Dec. 9, 1994

[51] Int. Cl.⁶ .................................................. F02M 25/07
[52] U.S. Cl. ........................................................ 123/571
[58] Field of Search ............................ 123/90.15, 90.16, 123/90.17, 568, 569, 571

[56] References Cited

U.S. PATENT DOCUMENTS

| | | | |
|---|---|---|---|
| 4,454,854 | 6/1984 | Gotoh et al. | 123/571 |
| 4,467,673 | 8/1984 | Hamada et al. | 123/571 |
| 4,736,728 | 4/1988 | Takahashi et al. | 123/571 |
| 5,117,784 | 6/1992 | Schechter et al. | 123/90.17 |
| 5,172,674 | 12/1992 | Horie et al. | 123/571 |
| 5,245,968 | 9/1993 | Kolias et al. | 123/414 |

*Primary Examiner*—Willis R. Wolfe
*Attorney, Agent, or Firm*—Allan J. Lippa; Roger L. May

[57] ABSTRACT

A powertrain controller controls the burned gas recycling rate of an engine as a function of a desired burned gas recycling rate and an actual burned gas recycling rate. The powertrain controller generates a tractive effort request value which is indicative of a force desired by the driver at the wheels of the vehicle. An engine load request value is generated as a function of the tractive effort request value and vehicle speed and is used, along with an actual load value, which is indicative of actual engine load, to generate the desired burned gas recycling rate. The tractive effort request value and other vehicle powertrain control variables are generated according to an optimization process. The burned gas recycling system of the engine may take the form of a Delta Pressure Feedback (DPFE) Exhaust Gas Recirculation (EGR) system or a variable position camshaft system.

19 Claims, 7 Drawing Sheets

BURNED GAS RECYCLING SYSTEM WITH POWERTRAIN OPTIMIZATION

FIELD OF THE INVENTION

This invention relates to the field of electronic powertrain control of a vehicle and more particularly to the field of controlling the amount of burned gas recycled by the engine.

BACKGROUND OF THE INVENTION

Vehicle engines typically incorporate burned gas control systems in order to reduce $NO_x$ emissions generated by the engine. As is known to those skilled in the art, the rate at which burned gas is recycled also affects the emissions, fuel economy and power output of an engine at a particular throttle position. Burned gas control systems typically take the form of an exhaust gas recirculation (EGR) mechanism which transports a controlled amount of exhaust gas from the exhaust manifold of the engine to the intake manifold to be mixed into an air/fuel mixture which is subsequently combusted. More recently, in engines with variable position camshafts, the recycling of burned gas is controlled by altering the phase angle of the camshaft to control the amount of burned gas which is recycled on a subsequent engine cycle.

Typically, the rate at which burned gas is recycled is determined by a powertrain controller as a function of the rotational speed of the engine and the air mass flow of the engine. A table which contains predetermined values for different engine speed and cylinder aircharge is accessed and a desired burned gas recycling rate value is retrieved. The degree to which engine power output required by the driver can be delivered, while meeting emissions constraints and maximizing fuel economy is dependent on a variety of factors in addition to engine speed and air mass flow into the engine. Conventional powertrain controllers, which utilize burned gas recycling, do not provide a mechanism to meet the power output required by the driver, while meeting emissions constraints and maximizing fuel economy, especially during transient operation. Instead, such systems decrease the burned gas recycling rate to assure the power output level desired by the driver. Unfortunately, this results in increased emissions and reduced fuel economy.

Accordingly, there is a need for a powertrain controller which controls the rate at which burned gas is recycled in a manner which provides vehicle power output requested by the driver, while minimizing fuel consumption and meeting emissions constraints.

SUMMARY OF THE INVENTION

It is an object of the present invention to provide a burned gas recycling control system which controls the burned gas recycling rate to meet the vehicle power output requested by the driver through a gas pedal, while minimizing fuel consumption and meeting emissions constraints.

In accordance with the primary object of the invention, in a preferred embodiment a vehicle, which includes an internal combustion engine with a burned gas recycling system, determines a burned gas rate value, which is indicative of the rate at which burned gas generated by the engine during a combustion cycle is recycled for combustion during a subsequent combustion cycle, by generating a tractive effort request value as a function of the speed of the vehicle and the angle of a throttle plate of the engine, and generating an engine load request value as a function of the speed of the vehicle and the tractive effort request value. An actual engine load value is also generated as a function of the air mass flow entering cylinders of the engine and the rotational speed of the engine. The burned gas rate value is generated as a function of the engine load request value and the actual engine load value.

An advantage of certain preferred embodiments is that controlling the burned gas recycling rate as a function of the tractive effort request and the vehicle speed maintains power output required by the driver at a given throttle position, while maximizing fuel economy and meeting emissions constraints.

These and other features and advantages of the present invention may be better understood by considering the following detailed description of a preferred embodiment of the invention. In the course of this description, reference will frequently be made to the attached drawings.

DETAILED DESCRIPTION

Figure 1:
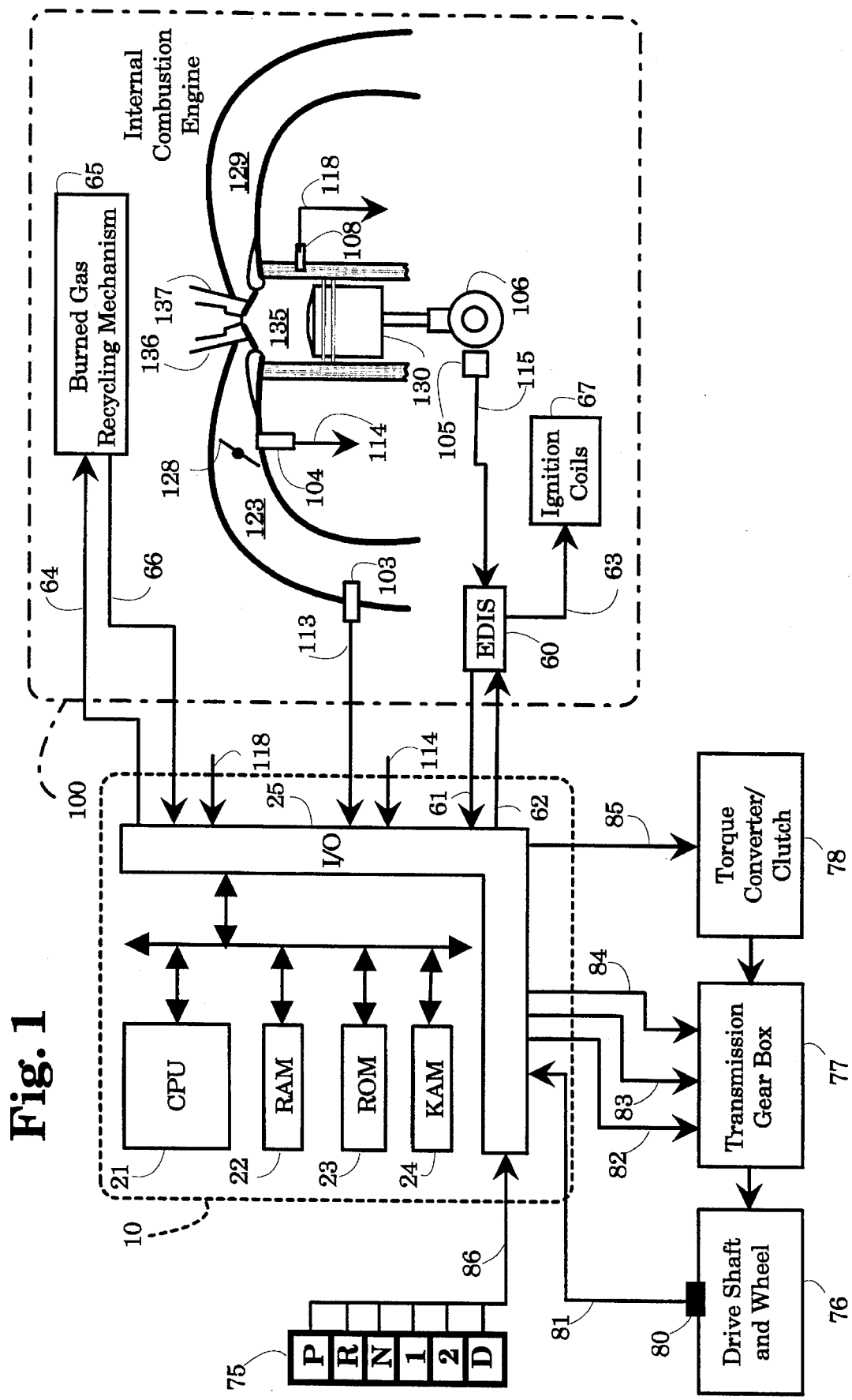
FIG. 1 of the drawings shows a block diagram of a powertrain system of a vehicle and a powertrain controller which embody the principles of the invention.

FIG. 1 of the drawings shows a vehicle powertrain which includes an engine 100, a transmission torque converter clutch 78, a transmission gear box 77 and a drive shaft and wheel(s) 76. Also shown in FIG. 1 is a block diagram of a Powertrain Control Module (PCM) 10 which includes a central processing unit 21, a read-only memory (ROM) 23 for storing control programs, a random-access memory (RAM) 22 for temporary data storage, a keep-alive-memory (KAM) 24 for storing learned values, a conventional data bus and I/O ports 25 for transmitting and receiving signals to and from the engine and the transmission. PCM 10 operates under stored program control to control the powertrain in response to sensed conditions which are indicative of a variety of atmospheric conditions, vehicle operating parameters and driver inputs, such as the position of throttle plate 128, and transmission shift positions 75.

Engine 100 draws an aircharge through an intake manifold 123 past throttle plate 128. Fuel is injected into the aircharge to create an air/fuel mixture which is drawn into combustion chamber 135. The air/fuel mixture is ignited in combustion chamber 135, and exhaust gas produced from combustion of the air/fuel mixture is transported past exhaust valve 137 through exhaust manifold 129. A piston 130 is coupled to a crankshaft 106. The mass flow rate of air entering cylinders of the engine is controlled by driver operated throttle 128.

A Mass Air Flow (MAF) sensor 103 mounted upstream of the throttle plate 128 detects the mass flow rate of air into cylinders of the engine and transmits a air mass flow rate signal 113 which is indicative of the air mass flow into the intake manifold 123 in pounds per minute (lbs/min) to PCM 10. Mass air flow sensor 103 preferably takes the form of a hot wire anemometer. A throttle position sensor 104 detects the angular position of throttle plate 128 and transmits a representative signal 114 PCM 10. Throttle position sensor 104 is conventional and preferably utilizes a rotary potentiometer to generate signal 114.

A crankshaft position sensor 105 transmits a crankshaft position signal 115 which is indicative of the angular position of crankshaft 15 to an Electronic Distributorless Ignition System (EDIS) 60 which provides an interface between the PCM and spark hardware within the engine. Crankshaft position sensor 105 which takes the form of a VRS or a Hall effect sensor, operates by detecting the rotation of teeth on a crankshaft sprocket positioned on crankshaft 106. The crankshaft sprocket preferably consists of thirty five teeth spaced ten degrees apart, which results in one tooth missing. This missing tooth preferably serves as a reference in identifying the position of crankshaft 15. EDIS 60 transmits a Profile Pick-up (PIP) signal 61 to PCM 10 which comprises a series of pulses, each of which has a period equal to the time for a crankshaft sprocket to rotate an angle encompassing 72/n teeth, where n is the number of cylinders in engine 5. Receiving a pulse width modulated spark output signal 62 from the PCM, EDIS 60 turns ignition coils 67 on and off at the correct time and in the proper sequence.

A burned gas recycling mechanism 65 operates under control of a burned gas recycling signal 64 to recycle a controlled amount of burned gas generated in a combustion cycle of the engine for combustion in a subsequent cycle. Burned gas recycling mechanism 65 generates an actual burned gas recycling rate signal 66 which is indicative of the actual rate at which burned gas is recycled by the engine.

PCM 10 also controls the operation of transmission torque converter clutch 78, and a transmission gear box 77 via signals 82, 83, 84 and 85 by means of conventional solenoids. A vehicle speed sensor 80 transmits a vehicle speed signal 81, which is indicative of the speed of the vehicle to PCM 10. Vehicle speed sensor 80 preferably takes the form of a variable reluctance sensor which senses the rotational speed of a driveshaft. PCM 10 also receives a transmission shift position signal 86 which is indicative of one of several shift level positions selected by an operator of the vehicle. Transmission torque converter clutch 78 is conventional and transmits engine power from crankshaft 15 to transmission gear box 77. Transmission torque converter clutch 78 improves fuel economy of the vehicle subject to the constraints of noise vibration and harshness (NVH). Transmission torque converter clutch 78 operates under control of a converter lock signal 85 to lock or unlock a transmission converter clutch. PCM 10 transmits gear selection information to transmission gear box 77 via gear shift signals 82–84 to shift control solenoid valves to select a desired gear for conversion of power to the driveshaft.

Figure 2A:
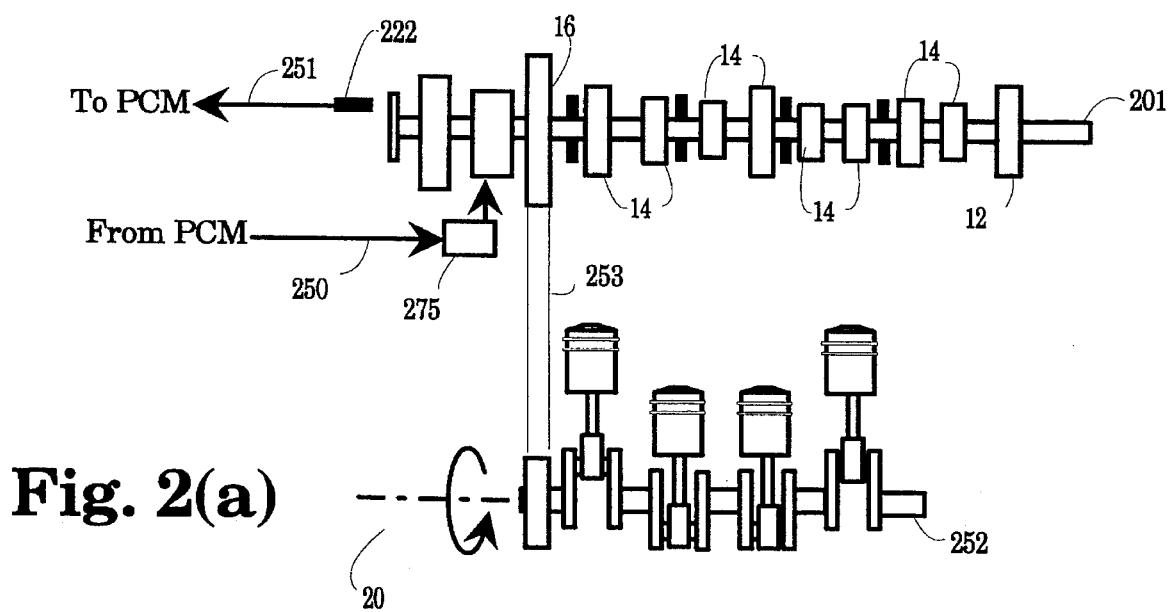
FIGS. 2(a) and 2(b) are block diagrams showing alternate preferred embodiments of the burned gas recycling system of FIG. 1.
Figure 2B:
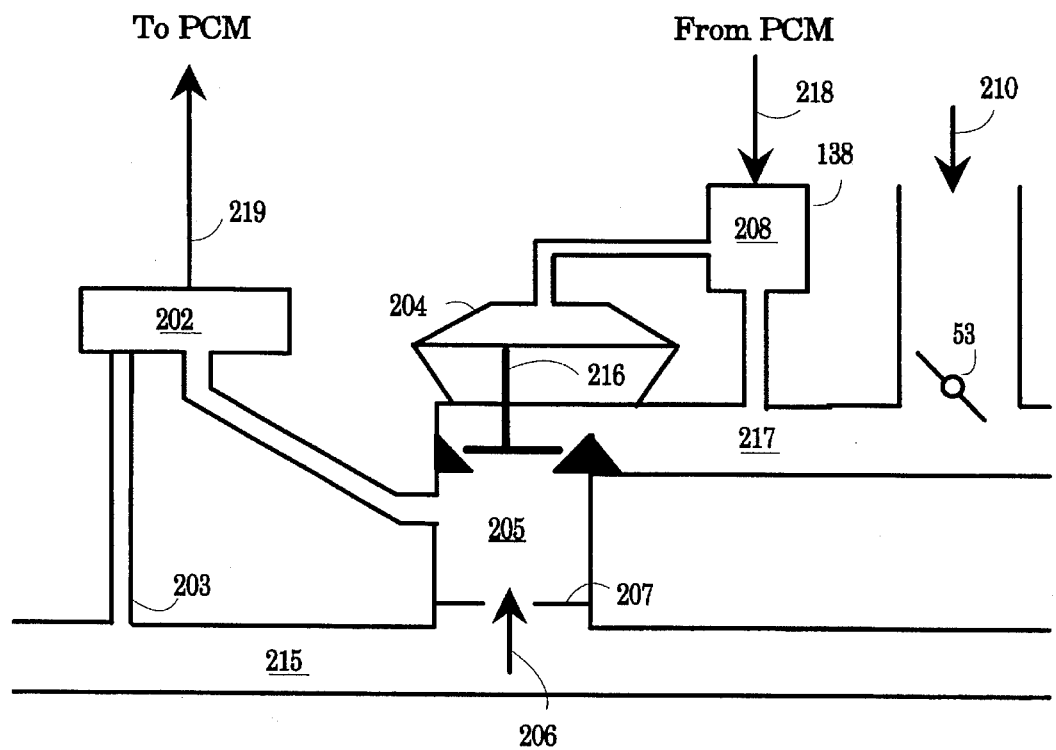

FIGS. 2(a) and 2(b) of the drawings show alternate preferred implementations of burned gas recycling system 65. FIG. 2(a) shows a preferred embodiment of burned gas recycling system 65 in the form of a variable position camshaft, the angular position of which is altered under control of PCM 10 to vary the burned gas recycling rate. Variable position camshaft 201 includes a plurality of cam lobes 14, the angular position of which, relative to crankshaft 252, may be altered to control the rate at which burned gas is recycled from a combustion cycle to a subsequent combustion cycle. Cam sprocket 16 of camshaft 201 is preferably rotated by crankshaft 252 by means of a belt or chain 253. Camshaft 201 rotates at half the angular velocity of crankshaft 252. Camshaft position signal 250, corresponds in the embodiment of FIG. 2(a) to burned gas recycling signal 64 of FIG. 1. A Variable Cam Timing (VCT) actuator 275 operates under control of camshaft position signal 250, which takes the form of a duty cycle signal, to vary the angular position of camshaft 201 relative to crankshaft 252. Variable position camshaft 201 preferably takes a form as described in U.S. Pat. No. 5,117,784 to Schechtar, et al. Camshaft position sensor 222 transmits an actual camshaft position signal 251 which is indicative of the angular position of the camshaft 201 to PCM 10. Actual camshaft position signal 251 corresponds in the embodiment of FIG. 2(a) to actual burned gas recycling rate signal 66 in FIG. 1. Referencing the current camshaft position from the signal 203, PCM 10 preferably generates a desired camshaft position signal in a manner described in U.S. Pat. No. 5,245,968 to Kolias et al.

The variable position camshaft of FIG. 2(a) may preferably be controlled in one of two manners to increase the burned gas recycling rate. First, in a dual equal cam phase shifting system, both intake and exhaust valve timing may be retarded in phase. In such a system, at part engine load, the delayed overlap causes the burned gas to flow into the intake manifold at the intake stroke during the period in which the exhaust valve is still open. In this manner, more burned gas is retained in the cylinder, including flow of burned gas which is reversed from the intake manifold back into the cylinder as soon as the exhaust valve is closed. A second manner to increase the burned gas recycling rate in the system of FIG. 2(a) is to increase the degree of overlap of the opening of the intake and exhaust valves. This can be accomplished either by opening the intake valve earlier, or by closing the exhaust valve later, or by a combination of the two.

FIG. 2(b) shows a preferred embodiment of burned gas control system 65 of FIG. 1 which takes the form of a Delta Pressure Feedback (DPFE) Exhaust Gas Recirculation (EGR) system. In FIG. 2(b) a portion of exhaust gas 206 is recirculated from exhaust manifold 215 through a controlled pressure chamber 205, past an EGR valve 216 and into intake manifold 217. EGR valve 216 operates under control of EGR rate signal 218 to vary the rate at which exhaust gas is recycled for combustion in a subsequent engine cycle. EGR rate signal 218 corresponds to burned gas recycling signal 64 of FIG. 1. Delta Exhaust Pressure Transducer (DEPT) sensor 202 transmits a pressure difference signal 219, which takes the form of an electrical voltage, to PCM 10, which is indicative of a pressure difference between passage 203 and control pressure chamber 205. The position of EGR valve is controlled by EGR rate signal 218 by means of an EGR vacuum regulator (EVR) 208 which controls the vacuum applied to EGR valve 131.

The improvement of fuel economy and reduction of exhaust emissions of a vehicle depends on the proper control of the following four major powertrain control systems:

(1) engine breathing system which comprises an air intake subsystem and a burned gas control subsystem, (2) spark ignition system, (3) sequential electronic fuel injection system, and (4) transmission system A preferred embodiment advantageously optimizes the operation of each of the aforesaid powertrain control systems by generating burned gas recycling signal 64 in a manner shown in FIGS. 3, 4, 5 and 6. FIGS. 3, 4, 5 and 6 illustrate in block diagram form, functions implemented as one or more stored programs executed by PCM 10.

Figure 3:
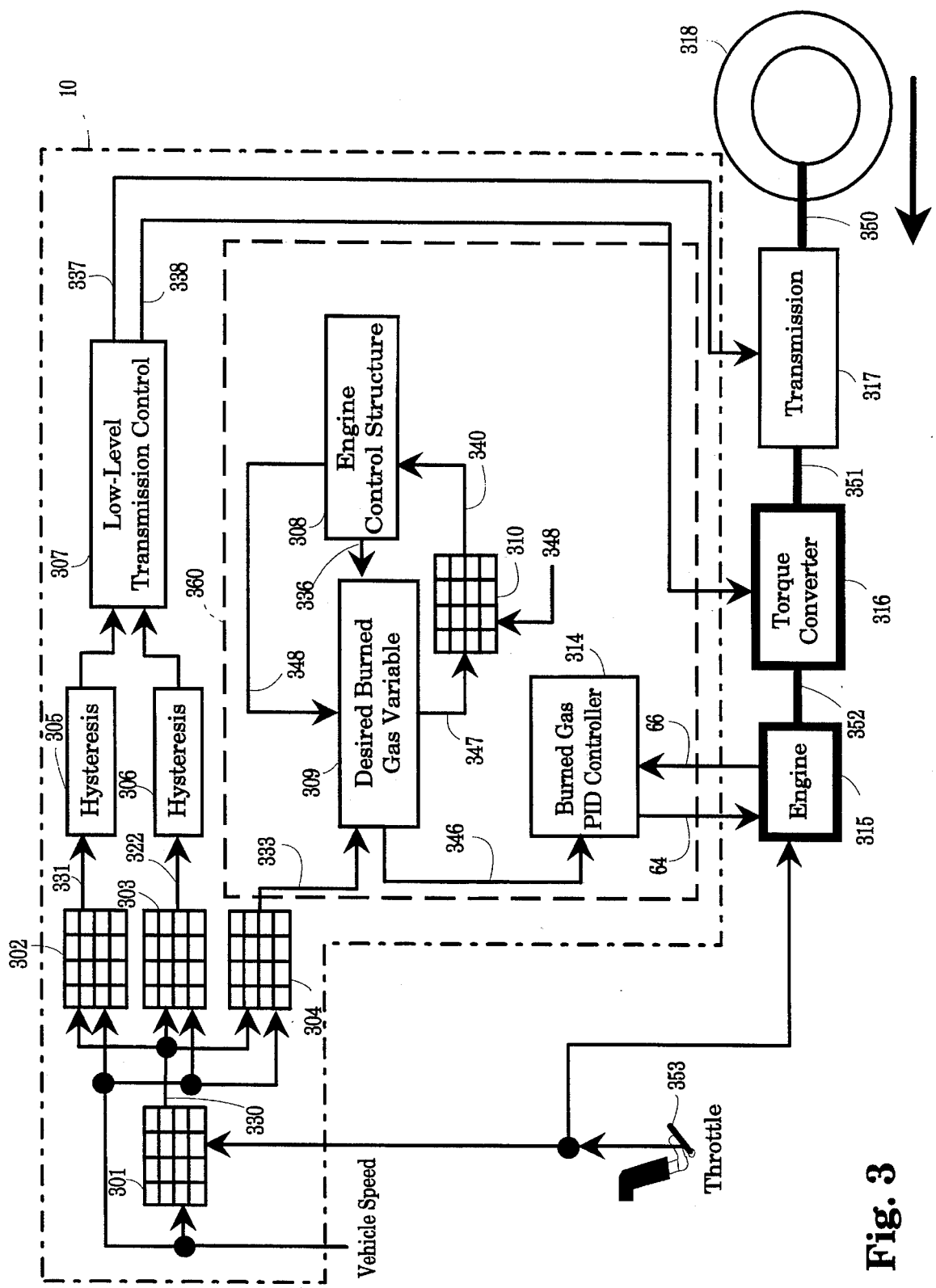
FIG. 3 is a diagram showing the operation of a preferred powertrain control strategy.

FIG. 3 of the drawings shows a block diagram of functions performed by PCM 10 to generate burned gas recycling signal 64, along with other signals used to control operation of the vehicle powertrain. The functions performed by the PCM 10 are shown within the boundaries of dotted line 10. A preferred embodiment utilizes a plurality of powertrain control variables—tractive effort request, gear request, torque converter lock state, engine load and spark advance stored in tables 302, 303, 304 and 310 respectively, to control operation of the vehicle powertrain. The aforesaid powertrain control variables are advantageously generated via an optimization process shown in FIG. 7 and described in the accompanying description. The term engine load, as used in the present specification, is defined to be the air mass flow into the intake manifold, divided by engine speed. Preferably, the engine load is also scaled by a scaling constant which is the reverse of aircharge at standard temperature and pressure.

A preferred embodiment advantageously generates a tractive effort request value 330 as a function of throttle position and vehicle speed by retrieving the tractive effort request value from a tractive effort table 301, which contains a plurality of tractive effort request values, indexed by vehicle speed and throttle angle. The tractive effort request value 330 advantageously represents a force desired by the driver of the vehicle at vehicle wheel 318. Tractive effort request value 330 is indicative of a force to be delivered to the wheels of the vehicle and is preferably modified by the PCM 10 to compensate for changes in barometric pressure and engine coolant temperature, using tables containing predetermined modification values. As will be appreciated by those skilled in the art in view of the present disclosure, the tractive effort request value is a function of the mass of the vehicle, times the vehicle acceleration plus the aerodynamic drag force on the vehicle.

The tractive effort request value 330 is then used as an index value, in conjunction with a vehicle speed value, which is indicative of speed of the vehicle, to generate a gear request value 331, a torque lockup request value 332 and an engine load request value 333.

Gear request value 331 is retrieved from a gear request table 302 which contains a plurality of gear request values, indexed by tractive effort request and vehicle speed. Torque lockup request value 332 is retrieved from a torque lockup table 303 which contains a plurality of determined torque lockup values, indexed by tractive effort request and vehicle speed. Engine load request value 333, which is indicative of a driver desired engine load, is retrieved from an engine load request table 304 which contains a plurality of engine load request values, indexed by tractive effort request and vehicle speed. The gear request value, torque lockup request value and the engine load request value each indicate driver desired powertrain performance parameters for different powertrain sub-systems. The gear request value and the torque lockup value are processed by hysteresis modules 305 and 306 in order to prevent hunting and are then provided to low-level transmission control module 307, which operates in a conventional manner to generate control valuess 337 and 338 for transmission 317 and torque converter 316 respectively.

The gear request table 302 provides the gear number in the transmission 317 which should be engaged at a given vehicle state, which is defined herein as a particular tractive effort at a given vehicle speed. The gear shift hysteresis function 305, provides a gear shift dead band, to prevent transmission shift gear hunting. Torque lockup table 303 and torque lock hysteresis function 306 operate in a similar manner.

Engine load request value 333 is processed by modules in dotted rectangle 360 in order to generate burned gas recycling signal 64 to maintain driver desired power, as indicated by throttle position signal 353, while maximizing fuel economy and meeting emissions constraints. Engine load request value 333 is received by desired burned gas variable module 309 which also receives engine speed value 348 and air mass flow rate value 336. Desired recycling burned gas variable module 309 operates in a manner to be described in FIG. 4 to generate an actual engine load value 347, which is indicative of actual engine load, as a function of the mass flow rate of air into cylinders of the engine and engine speed. As will be appreciated by those skilled in the art in view of the present disclosure, the actual engine load is proportional to the torque output of the engine. Desired burned gas variable module 309 also generates a desired recycling burned gas rate value 346 which is indicative of a desired burned gas recycling rate, as determined by module 309. Desired recycling burned gas rate value 346 takes the form of camshaft position signal 250 in an engine which utilizes a variable position camshaft as shown in FIG. 2(a) to implement a burned gas recycling system. Desired recycling burned gas rate signal 346 takes the form of EGR rate signal 218 in an engine which utilizes an EGR system as shown in FIG. 2(b) to implement a burned gas recycling system.

Engine control structure module 308 performs general engine control functions to control the amount of fuel injected, the spark timing and other engine control parameters necessary for proper operation of the engine. Engine control structure module 308 receives additional signals, which for clarity of description are not shown. The additional signals, which are generated by sensors positioned on the vehicle powertrain, are used by module 308 to generate values such as engine speed value 348 and air mass flow rate value 336 for use by other modules in FIG. 3.

Figure 7:
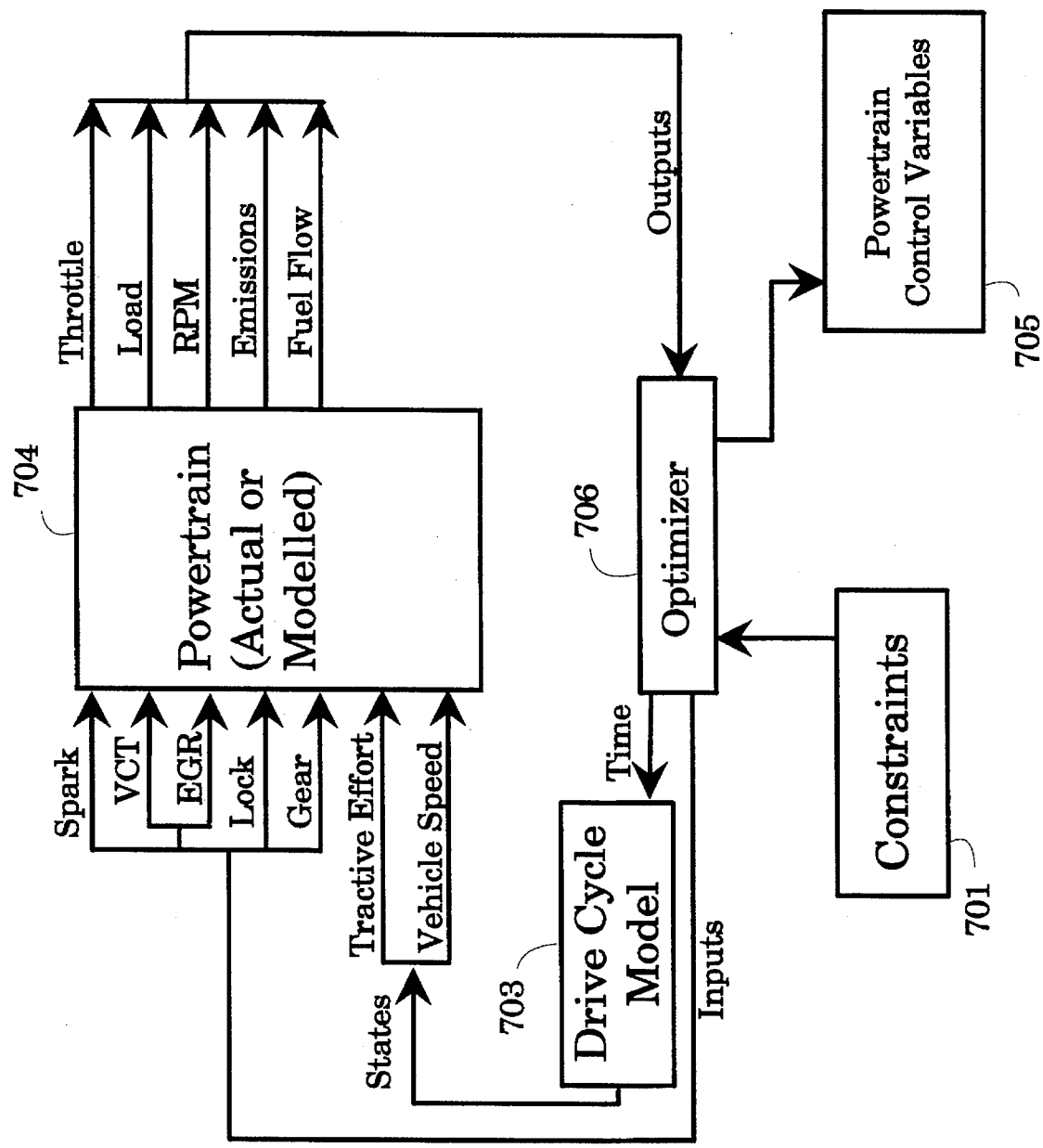
FIG. 7 is a diagram of a preferred method of generating powertrain control variables for use by the electronic engine controller.

Spark timing table 310 contains a plurality of spark timing values generated by the optimization process shown in FIG. 7. Each of the spark timing values in spark timing table 310 is indicative of spark timing at a particular actual engine load value 347 and engine speed value 348. The value retrieved from table 310 takes the form of an optimized spark timing value 340 for the particular engine speed and engine load as calculated by module 309. As will be appreciated by those skilled in the art in view of the present disclosure, spark timing value 340 is also a function of other variables such as engine temperature and barometric pressure, which for clarity of illustration are not shown in FIG. 3.

Burned gas PID controller 314 generates burned gas recycling signal 64 in accordance with desired burned gas rate value 346 and actual burned gas recycling rate value 66. The operation of burned gas controller is described in greater detail in the description accompanying FIG. 5.

Figure 4:
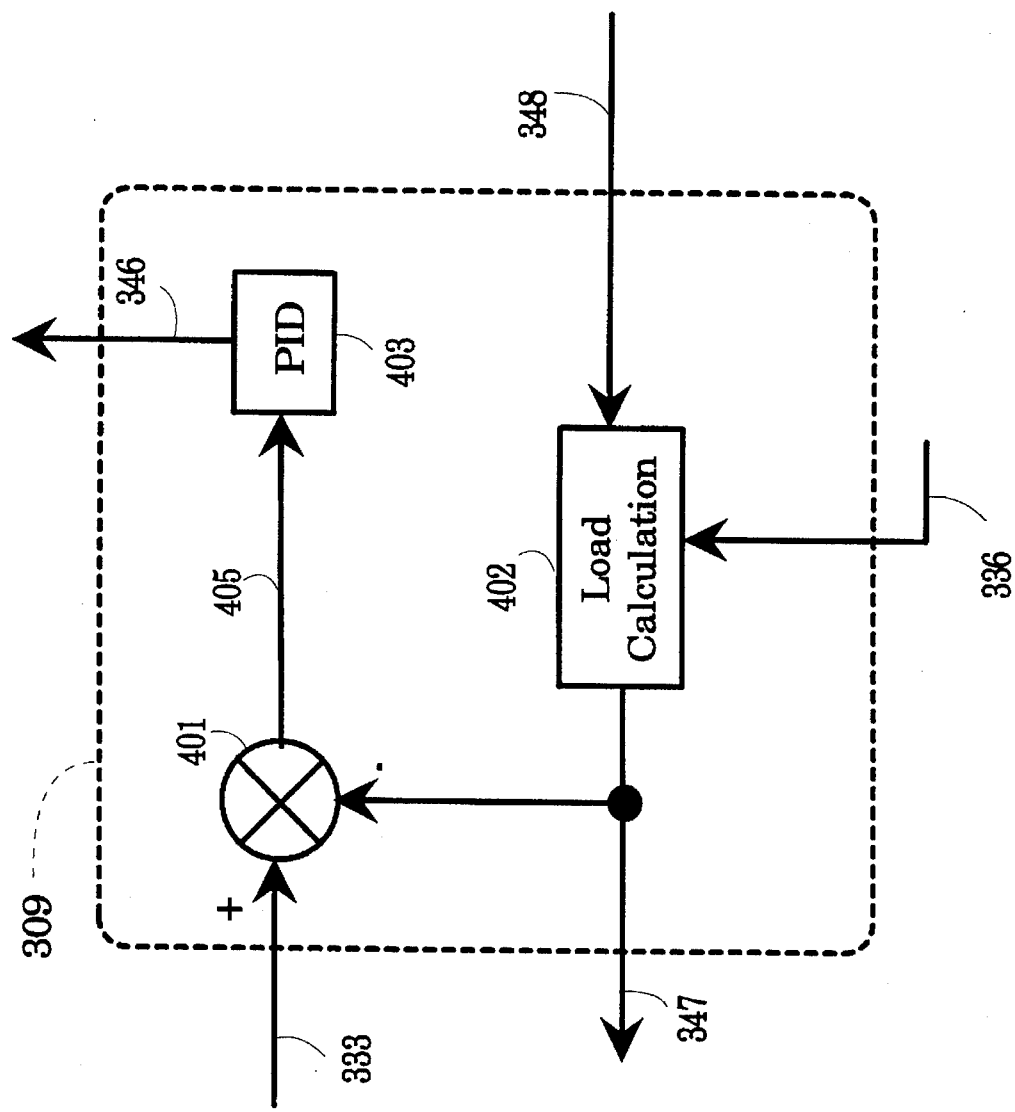
FIGS. 4, 5 and 6 are diagrams showing portions of FIG. 3 in greater detail.

FIG. 4 shows the operation of desired burned gas variable module 309 in greater detail. The actual tractive effort at the wheels of the vehicle must be equal or close to the desired tractive effort at a given throttle angle and vehicle speed. Module 309 advantageously generates desired burned gas rate value 346 to make the desired engine load equal to the actual engine load. In FIG. 4, engine load calculation module 402 receives engine speed value 348 and air mass flow rate value 336 and generates actual engine load value 347. The actual engine load value 347 is subtracted at 401 from engine load request value 333 to generate a engine load error value 405 which is indicative of the difference between the desired engine load generated by the PCM 10 at the specific tractive effort and vehicle speed and the actual engine load. At 403, proportional, derivative and integral feedback values are generated from the load error value 405 and respective gain coefficients. The proportional, derivative and integral feedback values are summed, and then subtracted from a predetermined maximum burned gas control value to generate desired burned gas rate value 346. The predetermined maximum burned gas control value is indicative of a maximum burned gas recycling rate. As will be appreciated by those skilled in the art in view of the present disclosure, a high rate of burned gas recycling is desirable to reduce fuel consumption and emissions especially for an engine operating at part throttle. A preferred embodiment provides as much burned gas recycling as possible to minimize fuel consumption and emissions while meeting desired tractive effort by reducing the burned gas recycling rate by an amount equal to the sum of the proportional, derivative and integral feedback values of the engine load error value 405. The proportional, derivative and integral feedback values are preferably generated according to the following relationships:

Proportional Feedback Value=$Ps+Pt*|d(TP)/dt|$

Integral Feedback Value=$Is+It*|d(TP)/dt|$

Derivative Feedback Value=$Ds+Dt*|(d(TP)/dt|$ where,

Ps, Is and Ds are calibratable gain constants for steady state engine operation and Pt, It, Dt are calibratable gain constants for transient engine operation; and $|d(TP)/dt|$ is the absolute value of the rate of the change of the throttle angle.

When the engine is operated at steady state, the rate of change of the throttle angle will be close to zero and the feedback values will be determined primarily by the calibratable gain constants for steady state engine operation.

In an engine which implements the burned gas recycling system in the form of a variable position camshaft as shown in FIG. 2(a) desired burned gas rate value 346 takes the form of a desired cam phase value which indicates an amount by which the phase angle of the camshaft is to be altered. In an engine which implements the burned gas recycling system in the form of a DPFE EGR system as shown in FIG. 2(b), desired burned gas rate value 346 takes the form of an EGR rate correction value which indicates an amount by which the EGR rate is to be altered.

Figure 5:
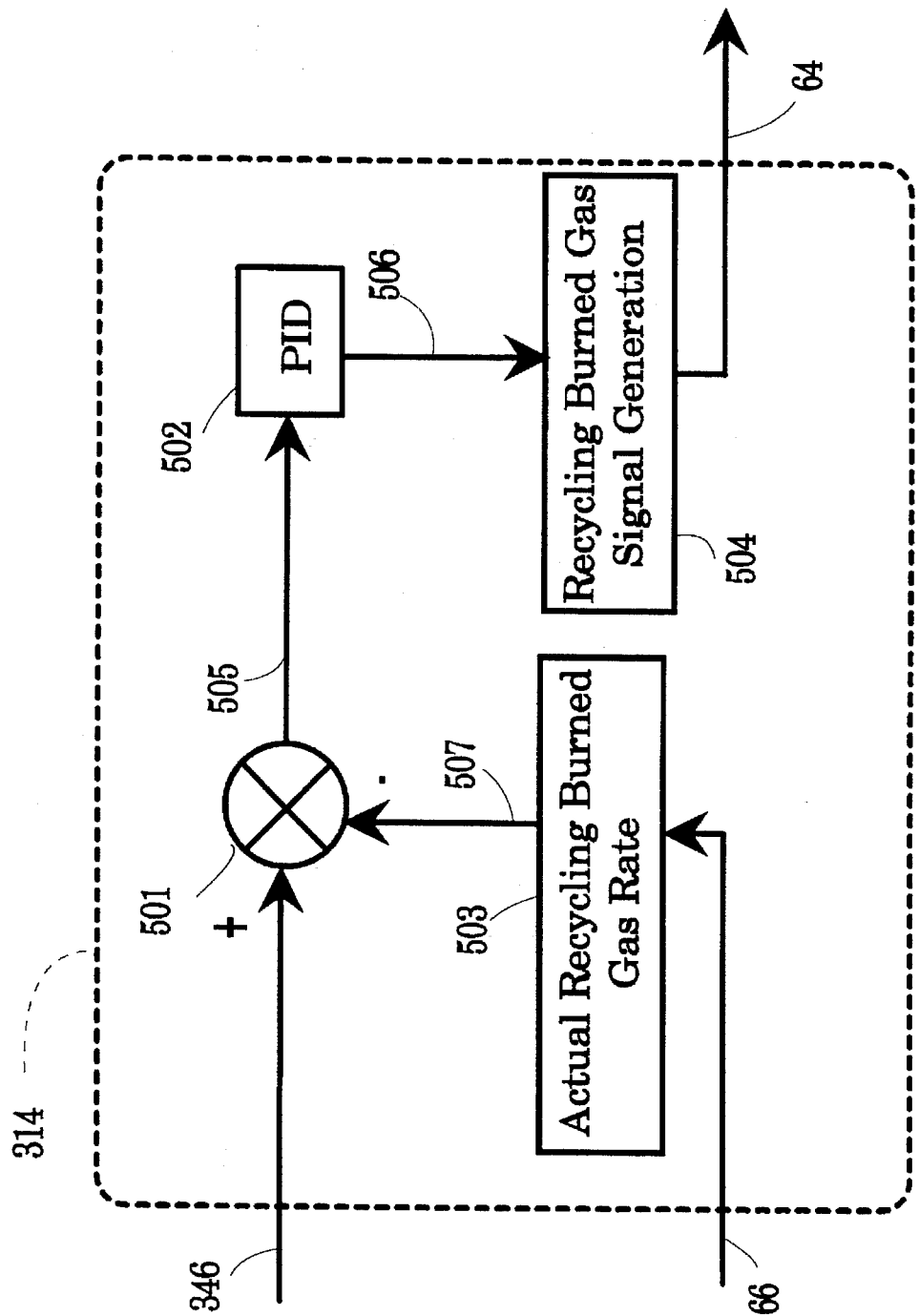

FIG. 5 shows the operation of burned gas PID controller 314 in greater detail. In FIG. 5, actual burned gas rate generation module 503 receives actual burned gas recycling rate signal 66, filters the signal and transmits a representative value to element 501 where it is subtracted from desired burned gas rate value 346 to generate a burned gas error value 505, which is indicative of a difference between desired recycling burned gas rate and actual recycling burned gas rate. At 502, proportional, derivative and integral feedback values are generated as a function of the burned gas error value 505. The proportional, derivative and integral feedback values are summed to generate a control duty cycle value 506 which is processed by conventional means at 504 into burned gas recycling signal 64 which takes the form of a pulse width modulated signal.

In an engine which implements the burned gas recycling system in the form of a variable position camshaft as shown in FIG. 2(a), actual burned gas recycling rate signal 66 corresponds to actual camshaft position signal 251, which module 503 transforms into value 507 which is indicative of the actual phase angle of camshaft 201. In an engine utilizing the embodiment of FIG. 2(a), desired burned gas rate value 346 is indicative of a desired cam phase angle. Element 501 generates value 505 which is indicative of a difference between the desired and actual cam phase angles, and PID module 502, generates proportional, integral and derivative components of the cam phase error, and sums them to generate value 506, which is modified by module 504 to generate signal 64 which is transmitted to VCT actuator 275 to cause the camshaft phase angle to change to a value as indicated by value 506.

In an engine which implements the burned gas recycling system in the form of a DPFE EGR system as shown in FIG. 2(b), actual burned gas recycling rate signal 66 corresponds to pressure difference signal 219, which module 503 transforms into value 507 which is indicative of the actual EGR rate. In an engine utilizing the embodiment of FIG. 2(b), desired burned gas rate value 346 is indicative of a desired EGR rate. Element 501 generates value 505 which is indicative of a difference between the desired and actual EGR rates, and PID module 502 generates proportional, integral and derivative components of the EGR error, and sums them to generate value 506, which is modified by module 504 to generate signal 64 which is transmitted to EGR vacuum regulator 208 to cause the EGR rate to change to a value as indicated by value 506.

Figure 6:
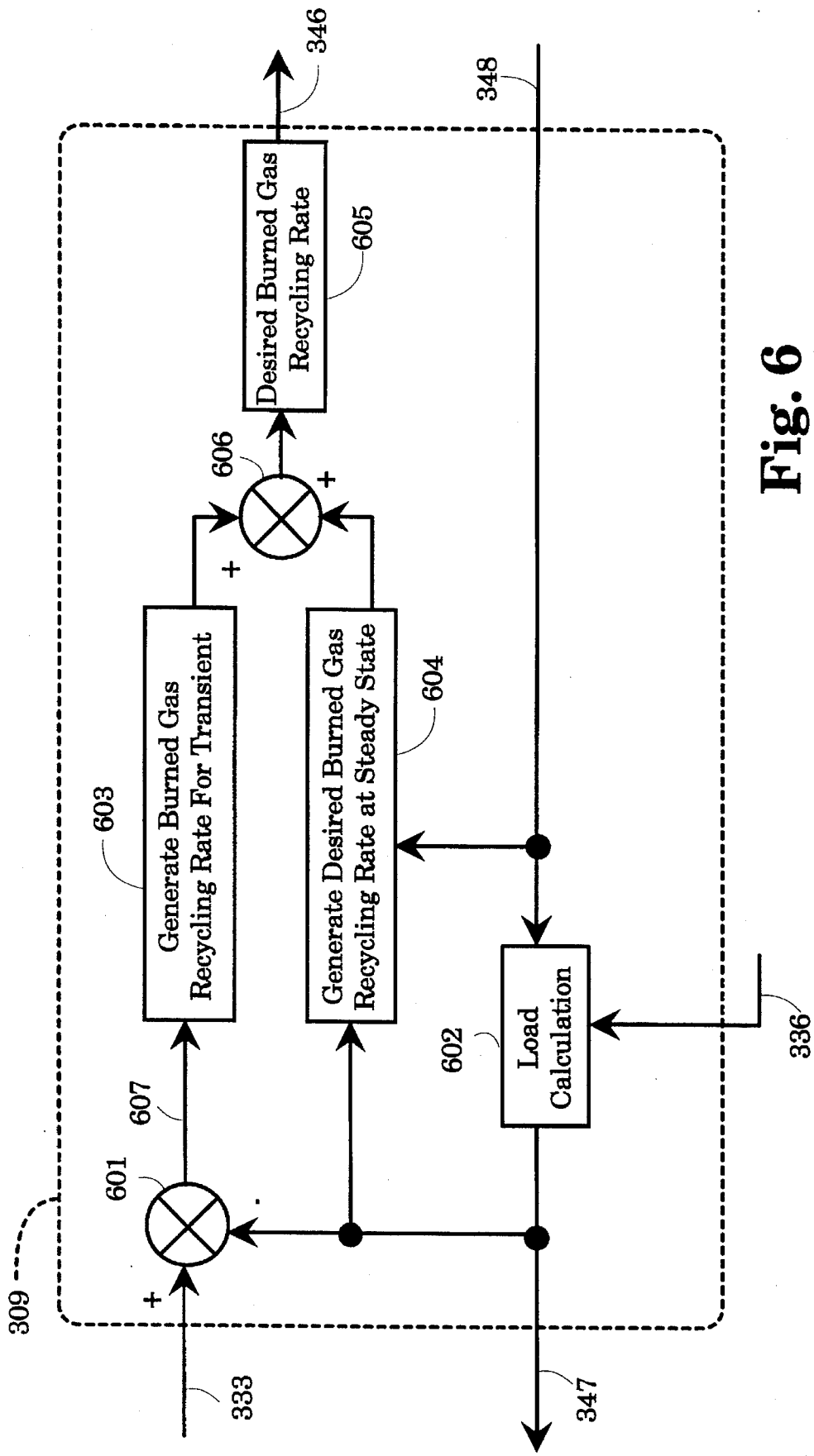

FIG. 6 of the drawings shows an alternative embodiment of burned gas variable module 309, which may be used to particular advantage to provide improved engine torque output during transient operating conditions. In FIG. 6, values 336 and 348 are received by engine load calculation module 602 which operates in a manner similar to module 402 of FIG. 4 to generate actual engine load value 347. Actual engine load value 347 is subtracted at 601 from engine load request value 333 to generate a engine load difference value 607 which is indicative of the difference between the desired engine load by PCM 10 at the specific tractive effort and vehicle speed and the actual load on the engine. At 603, a burned gas rate transient correction value is generated as a function of the engine load difference value 607 by generating proportional, derivative and integral difference components of the engine load difference value 607. The proportional, differential and integral difference values are then summed to generate the burned gas rate transient correction value. The feedback values assume the same form as in FIG. 4, however the calibratable gain coefficients Ps, Is, Ds, Pt, It and Dt, are calibrated to ensure proper system stability and faster reaction rate. At 604, a desired steady state burned gas rate value is generated as a function of engine speed value 348 and actual engine load value 347 by retrieving the desired steady state burned gas rate value from a steady state burned gas rate table which contains a plurality of values, generated by the optimization process shown in FIG. 7. Values contained in the steady state burned gas rate table are indexed by engine speed and actual engine load and are preferably generated in a manner shown in FIG. 7. The desired steady state burned gas rate value and the burned gas rate transient correction value are added at 606, and at 605, the desired burned gas rate value 346 is generated by conventional methods from the sum of the desired steady state burned gas rate value and the burned gas rate transient correction value. As can be seen, the mechanism of FIG. 6 generates the desired burned gas rate signal by generating the desired steady state burned gas rate value at 604 and modifying it at 606 with the transient correction value generated at 603. Such a mechanism advantageously generates the desired burned gas rate value 346 in a manner which improves engine torque output for all engine operating conditions; including steady state and transient operating conditions.

FIG. 7 of the drawings shows a preferred mechanism for generating the powertrain control variables contained in tables 301, 302, 303, 304 and 310 and the steady state burned gas rate table used in the mechanism of FIG. 6. As shown in FIG. 7, for a specific vehicle state variable—tractive effort and vehicle speed—inputs of the powertrain optimization process are the following powertrain control variables: spark timing, recycled burned gas, which is in the form of cam phase or EGR, transmission gear ratio and lock/unlock states; outputs are throttle angle, engine load, engine speed, engine exhaust emission flow and engine fuel flow. The powertrain control variables are advantageously generated by utilizing data, seen at 704, which is preferably obtained via a vehicle chassis dynamometer using an actual vehicle powertrain or via a vehicle simulation model using mapping data from engine dynamometer testing. Each of the powertrain control variables is optimized by (1) selecting a powertrain control variable to be optimized;

(2) generating an initial value for the powertrain control variable to be optimized, and for the other powertrain control variables;

(3) measuring the response of the powertrain in the form of the five outputs shown and storing the five measured outputs, and the values of the powertrain control variables which generated the outputs; and (4) calculating a cost function as a function of fuel flow, $NO_x$ and HC emssions.

Once the cost function is calculated at step (4) above, the selected powertrain control variable is altered, and steps (1) through (4) are repeated. On the subsequent iteration the selected powertrain control variable may either be maintained or changed to optimize a different powertrain control variable. The process is repeated until the derivative of the cost function converges to a value approaching zero. The vehicle state is then changed to a new value, and the process of optimizing the powertrain control variables is repeated. Because the effect of the powertrain control variables on the five outputs of the powertrain is interrelated, the optimization of one powertrain control variable affects the optimum value of the other powertrain control variables. A preferred embodiment performs repeated iterations of the optimization process to ensure convergence of the cost function. The range of vehicle states for which the powertrain control variables are optimized is determined at 703 by the CVS (constant volume sampling) drive cycle model specified by the federal government. The vehicle states are chosen preferably on points at which the CVS drive cycle frequently operates on.

The cost function in optimizer 706 preferably takes a form as shown in the equation below:

$$\text{cost}(i) = \frac{\partial \text{fuel\_flow}}{\partial x_i} + L1* \frac{\partial \text{nox\_flow}}{\partial x_i} + L2* \frac{\partial \text{hydrocarbon\_flow}}{\partial x_i}$$

where, $x_i$ is the target powertrain control variable to be optimized,

L1 is a weight factor of $NO_x$,

L2 is a weight factor of hydrocarbons, fuel\_flow is the rate of fuel flow of the powertrain 704, nox\_flow is the amount of $NO_x$ emissions generated by the powertrain 704, and hydrocarbon\_flow is the amount of hydrocarbons generated by the powertrain 704.

Operation of the optimization process as explained above can be seen by way of an example in which an engine utilizes a variable position camshaft as shown in FIG. 2(a). Let $x_1$ designate the desired cam phase at a specific vehicle state. L1 & L2 are respectively the weight factor of $NO_x$ and HC emissions. If the cam phase is chosen to be optimized at a given vehicle state, the optimization is performed with n iterations which means n combinations of cam phase and throttle angle at the given vehicle state. The n cost values can be calculated from the above cost function. The cost function can be seen to converge when the cost value cost (i) changes from a positive value to a negative value or vice versa. When this occurs the optimum cam phase equals the average of the two values about zero. Similarly, the other powertrain control variables can be optimized following the same procedure as for the cam phase. However, owing to the nonlinear characteristic of the powertrain control variables, repeated iterations is necessary to assure that the cost function has satisfied the cost equation for the all powertrain control variables.

Once the cost function for each of the powertrain control variables is minimized, each of the powertrain control variables is preferably further optimized by optimizer 702. First, a CVS driving trace is calculated by converting the CVS vehicle driving cycle into a vehicle driving force (tractive effort) vs. time trace. Next, the CVS vehicle driving trace is divided into a plurality of m different vehicle states and an equal number of m time intervals. The $NO_x$ and HC emissions and the fuel consumption are summed at the different vehicle states according to the following relationships:

$$CVS\ NO_x\ \text{Emission} = \sum_{i=1}^{m} Nox_i\ \text{flow}\ \Delta t_i$$

$$CVS\ NO_x\ \text{Emission} = \sum_{i=1}^{m} HC_i\ \text{flow}\ \Delta t_i$$

$$CVS\ \text{fuel consumption} = \sum_{i=1}^{m} \text{fuel flow}_i\ \Delta t_i$$

The resulting powertrain control variables are generated in a form directly useable in tables 301, 302, 303, 304 and 310. The optimizer 706 operates in accordance with constraints 701 which represent CVS emission and fuel consumption requirements. Calibration time and effort is greatly decreased by tuning the powertrain control variables via a mathematical model as opposed to iterative, manual tuning by human calibrators. A further advantage is that trade-offs between the powertrain control variables are made concurrently rather than sequentially, as is required by manual calibration.

It is to be understood that the specific mechanisms and techniques which have been described are merely illustrative of one application of the principles of the invention. Numerous modifications may be made to the methods and apparatus described without departing from the true spirit and scope of the invention. For instance, intake mixture dilution systems other than the EGR or variable position camshaft systems may be used.

What is claimed is:

1. In a vehicle which includes an internal combustion engine with a burned gas recycling system, a method for controlling the rate at which burned gas generated by said engine during a combustion cycle is recycled for combustion during a subsequent combustion cycle, comprising the steps of:

generating a tractive effort request value as a function of a vehicle speed signal, indicative of the speed of said vehicle, and a throttle angle signal, indicative of the angle of a throttle plate of said engine;

generating an engine load request value as a function of the vehicle speed signal and said tractive effort request value;

generating an actual engine load value as a function of an air intake signal indicative of the aircharge entering an intake manifold of said engine and an engine speed signal indicative of the rotational speed of the engine;

determining a burned gas rate value, which is indicative of the rate at which burned gas generated by said engine during a combustion cycle is recycled for combustion during a subsequent combustion cycle as a function of the difference between said engine load request value and said actual engine load value; and altering a burned gas rate actuator in accordance with said burned gas rate value to control said burned gas recycling rate.

2. The invention as set forth in claim 1 wherein the step of determining said burned gas rate value comprises the steps of:

generating a proportional error value, a derivative error value and an integral error value, as a function of the difference between said engine load request value and said actual engine load value by use of a proportional, integral and derivative controller;

generating a summed error value by adding said derivative error value, said integral error value and said proportional error value;

subtracting said summed error value from a predetermined maximum burned gas rate value to generate a desired burned gas rate value; and generating said burned gas rate value as a function of said desired burned gas rate value.

3. The method as set forth in claim 2 wherein the step of generating said burned gas rate value as a function of said desired burned gas rate value comprises the steps of:

generating an actual burned gas rate value as a function of a first signal which is indicative of an actual rate at which burned gas is being recycled by the engine;

generating a burned gas error value which is indicative of a difference between said actual burned gas rate value and said desired burned gas rate value;

generating a proportional error value, a derivative error value and an integral error value, as a function of the burned gas error value by use of a proportional, integral and derivative controller;

generating a summed error value by adding said derivative error value, said integral error value and said proportional error value; and generating said burned gas rate value as a function of said summed error value.

4. The invention as set forth in claim 1 wherein said step of determining a tractive effort request value comprises the step of retrieving said value from a table comprising a plurality of values each of which are indicative of a predetermined tractive effort request value at a particular vehicle speed and angle of said throttle plate.

5. The invention as set forth in claim 4 wherein the burned gas recycling system comprises an exhaust gas recirculation system which transports exhaust gas generated by the engine from an exhaust manifold of the engine to an intake manifold of the engine according to a rate determined by an exhaust gas recirculation value which corresponds to said burned gas rate value.

6. The invention as set forth in claim 5, wherein the step of determining said burned gas rate value comprises the steps of, generating a first value indicative of a desired egr rate as a function of said tractive effort request value;

generating a second value indicative of the actual egr rate as a function of the rotational speed of the engine and the aircharge entering an intake manifold of the engine;

determining the difference between said first value and said second value to generate a third value; and determining said burned gas rate value as a function of said third value.

7. The invention as set forth in claim 4 wherein the burned gas recycling system comprises a variable position cam shaft the position of which is determined as a function of said burned gas rate value.

8. The invention as set forth in claim 7 wherein the step of determining said burned gas rate value comprises the steps of, generating a first value indicative of a desired phase angle of said camshaft relative to an engine crankshaft as a function of said tractive effort request value;

generating a second value indicative of the actual phase angle of said camshaft relative to the engine crankshaft as a function of a value indicative of the angular position of said crankshaft and a value indicative of the angular position of said camshaft;

determining the difference between said first value and said second value to generate a third value; and determining said burned gas rate value as a function of said third value.

9. The invention as set forth in claim 1 wherein the step of determining said burned gas rate value comprises the steps of:

generating a proportional error value, a derivative error value and an integral error value, as a function of the difference between said engine load request value and said actual engine load value by use of a proportional, integral and derivative controller;

generating a summed error value by adding said derivative error value, said integral error value and said proportional error value;

generating a steady state burned gas value from a first table which contains a plurality of steady state burned gas values, indexed as a function of the difference between said engine load request value and said actual engine load value;

adding said summed error value and said steady state burned gas value to generate a desired burned gas rate value; and generating said burned gas rate value as a function of said desired burned gas rate value.

10. The method as set forth in claim 9 wherein the step of generating said burned gas rate value as a function of said desired burned gas rate value comprises the steps of:

generating an actual burned gas rate value as a function of a first signal which is indicative of an actual rate at which burned gas is being recycled by the engine;

generating a burned gas error value which is indicative of a difference between said actual burned gas rate value and said desired burned gas rate value;

generating a proportional error value, a derivative error value and an integral error value, as a function of the burned gas error value by use of a proportional, integral and derivative controller;

generating a summed error value by adding said derivative error value, said integral error value and said proportional error value; and generating said burned gas rate value as a function of said summed error value.

11. The invention as set forth in claim 10 wherein the burned gas recycling system comprises an exhaust gas recirculation system which transports exhaust gas generated by the engine from an exhaust manifold of the engine to an intake manifold of the engine according to a rate determined by an exhaust gas recirculation value which corresponds to said burned gas rate value.

12. The invention as set forth in claim 10 wherein the burned gas recycling system comprises a variable position cam shaft the position of which is determined as a function of said burned gas rate value.

13. In a vehicle which includes a burned gas recycling system for recycling a controlled amount of burned gas generated from combustion of an air/fuel mixture, for combustion in a subsequent cycle, a vehicle powertrain controller comprising, in combination:

means, responsive to a vehicle speed signal, for generating a vehicle speed value which is indicative of the speed of said vehicle;

means, responsive to a throttle angle signal for generating a throttle angle value which is indicative of the angular position of a throttle plate;

means, responsive to said vehicle speed value and to said throttle angle value for generating a tractive effort request value indicative of an engine torque output requested by a driver of said vehicle;

means, responsive to said vehicle speed value and to a load value which is indicative of engine load, for generating an actual engine load value indicative of torque being generated by the engine;

means responsive to said tractive effort request value and to said vehicle speed value for generating an engine load request value, indicative of desired engine load;

means, responsive to said engine load request value and to said actual engine load value, for generating an engine load difference value;

PID control means, responsive to said engine load difference value, for generating a desired burned gas rate value by use of a proportional, integral and derivative controller;

means responsive to said desired burned gas rate value and to an actual burned gas rate value, indicative of a burned gas recycling rate of said engine, for generating a burned gas rate value indicative of a change in the amount of burned gas being recycled by said engine in an engine cycle for combustion in a subsequent cycle; and a burned gas actuator, responsive to said burned gas rate value, for altering the rate at which said burned gas is recycled.

14. The invention as set forth in claim 13 wherein the vehicle powertrain controller further comprises means responsive to said tractive effort request value for generating a gear ratio value indicative of a gear within a transmission of the vehicle to be engaged for transfer of power from said engine to a driveshaft of the vehicle.

15. The invention as set forth in claim 13 wherein the means for generating a tractive effort request value comprises means for retrieving said tractive effort request value from a table comprising a plurality of tractive effort request values, indexed by said vehicle speed value and said throttle angle value.

16. The invention as set forth in claim 15 wherein the tractive effort request values contained in the tractive effort request table are generated according to an optimization process which generates a plurality of powertrain control variables, said powertrain control variables including said tractive effort request values, the optimization process comprising the steps of:

(i) selecting a powertrain control variable to be optimized, and selecting an initial value for each of said powertrain control variables, (ii) operating said vehicle powertrain in accordance with the selected values of said powertrain control variables, and measuring the response of said vehicle powertrain to said powertrain control variables, to generate a plurality of corresponding powertrain output values, and storing said powertrain output values, (iii) modifying the powertrain control variable to be optimized by calculating a cost value as a function of said powertrain output values, (iv) repeating steps (ii) and (iii) until said cost value equals a value substantially equal to zero, (v) repeating steps (i) through (iv) for each of said powertrain control variables, and generating said powertrain control variables for use by said powertrain controller as a function of the values of said powertrain control variables and said powertrain output values.

17. The invention as set forth in claim 13 wherein the burned gas recycling system comprises an exhaust gas recirculation system which transports exhaust gas generated by the engine from an exhaust manifold of the engine to an intake manifold of the engine according to a rate determined by an exhaust gas recirculation value which corresponds to said burned gas rate value.

18. The invention as set forth in claim 13 wherein the burned gas recycling system comprises a variable position cam shaft the position of which is determined as a function of said burned gas rate value.

19. The invention as set forth in claim 18 wherein the vehicle powertrain controller further comprises a means for determining spark timing as a function of said burned gas rate value.

* * * * *